Figure 1:
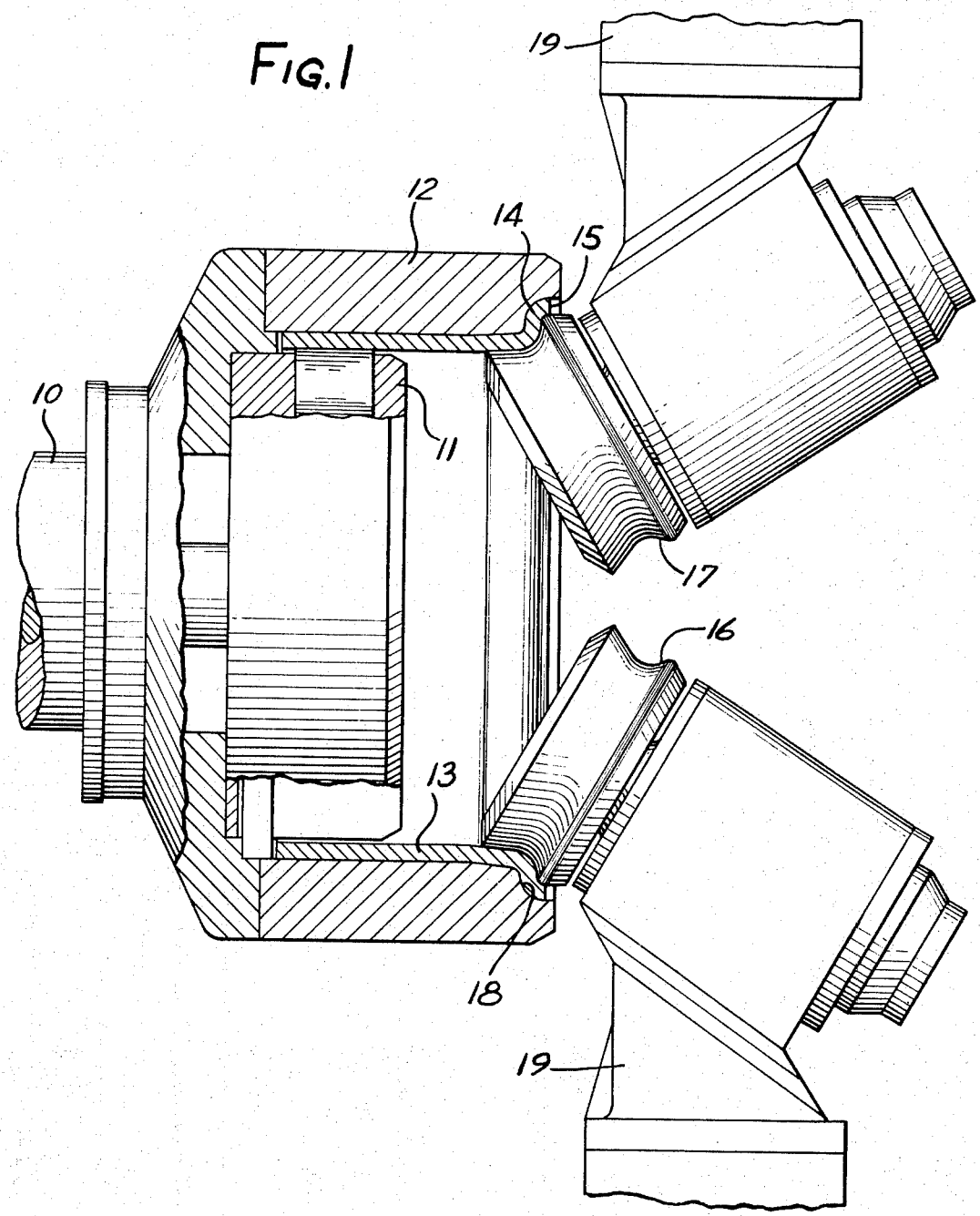

United States Patent [19]
Schröder

[11] 3,779,060
[45] Dec. 18, 1973

[54] METHOD AND APPARATUS FOR MAKING STEPPED RIMS

[75] Inventor: Paul B. Schröder, Hamm/Westfalen, Germany

[73] Assignee: Leifeld & Co., Ahlen/Westfalen, Germany

[22] Filed: Sept. 16, 1971

[21] Appl. No.: 181,170

[30] Foreign Application Priority Data
Oct. 28, 1970 Germany............ P 20 53 005.6

[52] U.S. Cl............................. 72/87, 29/159.1
[51] Int. Cl............................. B21d 22/18
[58] Field of Search............ 29/159 R, 159 A, 29/159.1, 159.02, 159.03; 72/80, 81, 82, 86, 87, 370

[56] References Cited
UNITED STATES PATENTS

| 3,681,962 | 8/1972 | Marcovitch | 72/87 |
| 3,255,518 | 6/1966 | Golata | 29/159.1 |
| 3,258,833 | 7/1966 | Schuttler | 29/159.1 |
| 3,282,078 | 11/1966 | Kaesemeyer | 29/159 R |
| 3,388,576 | 6/1968 | Ernestus | 72/83 |

FOREIGN PATENTS OR APPLICATIONS

| 234,826 | 3/1945 | Switzerland | 29/159.1 |

Primary Examiner—Richard J. Herbst
Attorney—William E. Anderson et al.

[57] ABSTRACT

A method and apparatus for manufacturing a stepped rim from a cylindrical ring is provided. The ring is bent outwardly at one end to form a clinch and the opposite end of the ring is indented to form a locking ring groove.

4 Claims, 2 Drawing Figures

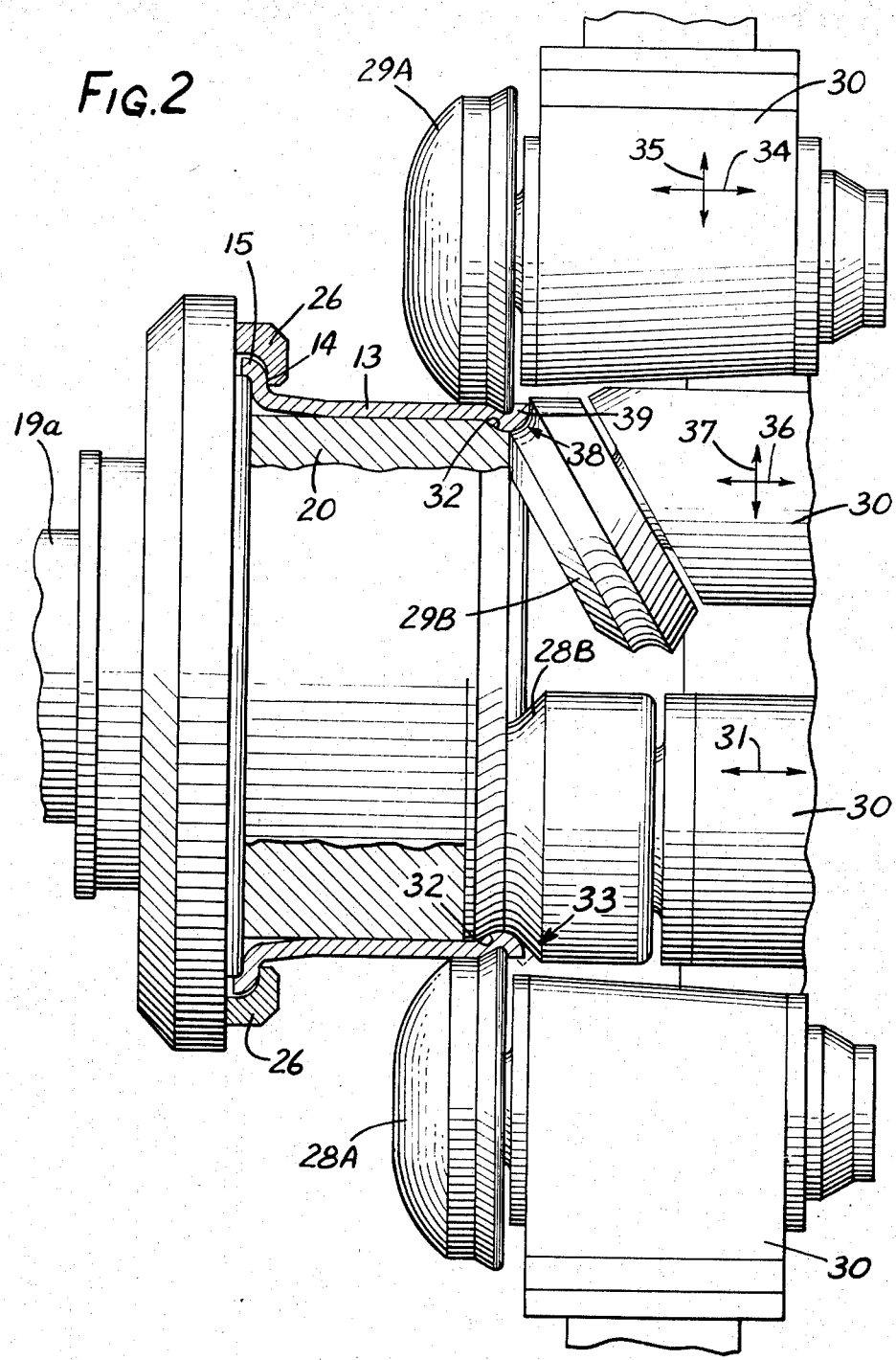

METHOD AND APPARATUS FOR MAKING STEPPED RIMS

This invention relates to a method and apparatus for making stepped rims from flat stock, usually of steel. More specifically, it relates to a method and apparatus using flat strips cut to the appropriate length. Each strip is first rounded into cylindrical form and the ends are welded together upon a longitudinal seam to form a ring. A stepped shoulder, a clinch, and a locking ring groove are thereupon formed on the ring to produce a stepped rim.

Heretofore, stepped rims such as for trucks and other vehicles have been made almost exclusively by rounding and welding profiled steel stock. However, this rolled profiled material is substantially more expensive than flat stock so that the trend has been gradually directed toward using flat stock for the manufacture of rims.

Furthermore, due to the great variety of different rim widths which are demanded by the market, the manufacturers of rims have been forced to keep on stock different stock materials rolled to profile. Such inventories are not necessary to the same degree when flat material is used to make the rims because such material can be purchased easily and quickly in every desired dimension.

Accordingly, stepped rims have been increasingly made from flat steel stock. Flat steel strips which have been cut to length are bent into a round configuration and the end welded together along a longitudinal seam to form a cylindrical ring. The stepped shoulder, the clinch and the locking ring groove of the rim are then formed successively in a number of operations on heavy hydraulic bead forming machines and presses.

However, this mode of manufacture is subject to several disadvantages. Apart from the greater than average high costs of investment for the equipment for profiling the rims, the rims are always reshaped on hydraulic bead forming machines between a pair of bead rolls. This has the consequence of the rims becoming not circular during the processing thereof. Thus, a subsequent expanding and calibrating step is absolutely necessary in any case. The tolerances to be obtained with such processing are rather wide and do not ensure absolute lack of eccentricity.

Accordingly, it is an object of the invention to provide a method and apparatus for making stepped rims which is rapid and accurate while maintaining very close tolerances, which is automatic and which utilizes a small number of machine units of low cost rather than expensive hydraulic bead forming machines.

Other objects and advantages of the invention will become apparent from the following description and the accompanying drawings in which:

FIG. 1 is a partially sectioned side view illustrating the formation of the stepped shoulder and of the clinch, and FIG. 2 is a partially sectioned side view illustrating the formation of the locking ring groove.

Very generally, the disclosed method is one in which a rolled and welded ring or blank is positioned within a closed external chuck. One end of the ring is bent to form a stepped shoulder and a clinch in an upright position on the ring by means of a front roll and a rear roll. Thereupon, the workpiece or blank is reversed in position and clamped adjacent the clinch onto a closed internal chuck. A locking ring groove is then indented on the end of the rim remote from the clinch by means of a front pair of rolls and a rear pair of rolls.

The disclosed apparatus for making stepped rims from flat steel stock has a machine spindle or shaft which may be hudraulically powered. The shaft supports both an internal chuck and an external chuck which is of greater length than the internal chuck. Between these chucks a cylindrical ring blank is clamped. A front roll and a rear roll for forming a stepped shoulder and an upstanding clinch are provided, which rolls are adapted to be advanced into the opening of the external chuck and the ring. In a second apparatus disposed behind the first apparatus, a machine spindle or shaft has disposed thereon a chuck for clampingly receiving the end of the workpiece having the clinch thereon, and a front pair of rolls and a rear pair of rolls is provided for indenting the locking ring groove.

More specifically, as shown in FIG. 1, apparatus for reshaping the rim including various features of the invention includes a first spin pressing machine including a spindle or shaft 10 carrying an internal chuck 11 and an external chuck 12. The shaft may be hydraulically powered and automatically operated. The external chuck 12 is of greater length than the internal chuck 11. A rolled cylindrical ring or rim blank 13 is disposed between chucks 11 and 12. The blank is expanded at one end to form a stepped shoulder 14 and a clinch 15 by means of leading or front roll 16 and a trailing or rear roll 17 which are movable into the opening of the external chuck and the blank to engage the blank. The rolls are so shaped as to cooperate with a shaped inner edge 18 of the external chuck 12 which serves as the abutment for forming the stepped shoulder 14 and the clinch 15. The rolls are supported and moved by supports 19 which may be hydraulically actuated.

As shown in FIG. 2, the apparatus further includes a second spin pressing machine having a rotatable spindle or shaft 19a which carries an internal chuck 20. A cylindrical workpiece 13 having a stepped shoulder 14 and a clinch 15 which may be preformed as shown in FIG. 1 is positioned outside the chuck 20 by means of clamping means 26 which engages the shoulder and clinch. A leading or front pair of rolls 28A and 28B and a trailing or rear pair of rolls 29A and 29B are positioned adjacent the end of the rim opposite the clinch on movable supports 30 which may be hydraulically actuated. As may be seen, one of the leading rolls 28A is positioned outside of the workpiece 13 and is movable toward the workpiece while the other of the leading rolls 28B is positioned beyond the end of the workpiece and is movable partially into and out of the opening of the workpiece in the directions of the arrow 31. The leading rolls 28A and 28B are so shaped as to cooperate with a shaped outer edge 32 of the internal chuck 22 which serves as an abutment. As the spindle is rotated the edge of the workpiece is first indented by the action of the leading rolls and chuck to the configuration shown in phantom at 33.

As also may be seen, one of the trailing rolls 29A is positioned outside of the workpiece and is movable in two directions as shown by the arrows 34 and 35 so as to first act in cooperation with the abutment 32 and the roll 28A to indent the workpiece. The other of the trailing rolls 29B is positioned beyond the end of the workpiece and is movable partially into the opening of the workpiece and also perpendicular to the end as shown by the arrows 36 and 37. The trailing rolls 29A and 29B are also mounted on movable supports 30 which may be hydraulically actuated. The trailing rolls are so shaped as to cooperate with each other to bend the end of the workpiece into an upright position as shown at 38 to complete formation of a locking groove 39.

In detail, the sequence of operation in the manufacture of a rim is as follows:

Upon welding of the longitudinal seam and smoothening same, the cylindrical ring 13 or blank is first conveyed, by a conveyor means (not shown) to the center axis of the machine. Thereafter, the ring is automatically pushed into external chuck 12, e.g., by means of the tailstock, and then clamped between the external chuck 12 and internal chuck 11 by means of a combined clamping and ejecting device (not shown). Upon initiation of rotary movement of the shaft 10, the stepped shoulder 14 and the clinch 15 are formed by means of the two processing rolls 16 and 17 pressing the rim against the abutment 18 in two passes. After stopping the rotary movement, the workpiece 13 is ejected from between the chucks 11 and 12 and conveyed to the next machine through a transfer device (not shown). At the same time, a new ring is advanced into the first machine.

The preformed workpiece 13 is then reversed in position and placed on the chuck 20 of the second machine with the aid of known devices subject to the expert's choice. The stepped and clinch end of the workpiece is then clamped on the second machine by the clamping means 26. The two pairs of drawing rolls 28A and 28B and 29A and 29B are advanced towards the other end of the workpiece in order to form the locking ring groove in cooperation with the abutment 32 of the chuck 20. In this shaping operation, the outer rolls 28A and 29A and the other leading roll 28B first are moved onto the workpiece to cooperate with the edge 32 of the internal chuck and indent the groove and then both rolls 29A and 29B cooperate to bend the edge thereof into an upright position to complete forming of the locking groove 39.

The edges of the internal chuck 20 and of the external chuck 12 are provided with suitable recesses as shown in the Figures for forming the rim in the desired shape. The spindles or shafts 10, 19a of both machines are rotated for the reshaping operation in known manner by expedient means. The movements of the rolls 16, 17, 28A, 28B, 29A, 29B respectively, are likewise effected in known manner through supports moved, e.g., by hydraulic means. The control of the machines, of the transfer and clamping or ejecting devices and of the roll supports can be performed manually, or if desired, in an automatic manner by programmed control.

The method and the apparatus according to the invention provide some important advantages. For example, the expansion of the clinch and the indentation of the locking ring groove can be performed in an automatic process by positioning two machine units one behind the other. Withdrawal after a partial processing operation for further processing on another machine is no longer necessary.

Another substantial advantage resides in the reshaping of the workpieces on external or on internal closed chucks. The workpieces are completely surrounded by the chucks. The reshaping operations per se are performed by means of a pair of rolls, i.e., a front roll and a rear roll. This ensures uniform stressing of the material and prevents the workpieces from becoming eccentric. The tolerances to be obtained thereby can be kept to very close limits. The method according to the invention and the apparatus proposed for carrying out such method are particularly suitable for the production of truck rims although similar shapes could be formed without departing from the invention.

Various features of the invention are set forth in the accompanying claims.

I claim:

1. A method of manufacturing stepped rims from a flat steel strip, forming the flat steel strip into a cylindrical ring having a predetermined cross-sectional thickness corresponding to the thickness of the flat steel strip, clamping the ring externally and internally with force to hold the ring against becoming eccentric during a bending of a clinch, bending a first end of the ring outwardly while it is clamped to form a clinch and without reducing substantially the cross-sectional thickness of the ring, repositioning the ring and again clamping the ring with external and internal forces to hold the same, indenting the other end of the ring to form a locking ring groove therein while said ring is clamped, and then bending an edge of the locking ring groove into an upright position thus completing the formation of the locking ring groove and thereby providing a ring having a clinch at one end and a locking ring groove at the other end with a central portion having a thickness substantially equal to the thickness of the flat strip from which the ring was formed.

2. A method in accordance with claim 1 wherein said clinch and said locking groove are shaped by a rolling operation.

3. An apparatus for making a stepped rim from a cylindrical ring having a predetermined cross-sectional thickness comprising an internal rotatable chuck for telescopingly receiving and supporting said ring, an external chuck for clamping said ring to said internal chuck to rotate therewith, a shaped edge on one edge of said internal chuck for shaping one end of said cylindrical ring, a pair of leading rolls for engaging said one end of said ring and for deforming the same in cooperation with said shaped edge to form a locking ring groove thereon, and a pair of trailing rolls for engaging the previously deformed portion of said ring and for bending an edge thereof to an upright position to complete said locking ring groove, said trailing pairs of rolls also cooperating with said shaped edge of said internal chuck while completing the forming of said locking ring groove.

4. An apparatus according to claim 3 wherein one of said leading rolls and one of said trailing rolls are positioned circumferentially outward of said ring and the other of said leading rolls and the other of said trailing rolls are positioned to move axially and partially into an opening in the ring.

* * * * *